United States Patent [19]

Holm-Kennedy et al.

[11] Patent Number: 4,960,177

[45] Date of Patent: Oct. 2, 1990

[54] SILICON MEMBRANE MICRO-SCALE

[75] Inventors: James W. Holm-Kennedy; Donald K. Umemoto, both of Honolulu, Hi.

[73] Assignee: University of Hawaii, Honolulu, Hi.

[21] Appl. No.: 201,881

[22] Filed: Jun. 3, 1988

[51] Int. Cl.⁵ .......................... G01G 3/14; G01L 9/12
[52] U.S. Cl. .................................... 177/210 C; 73/718
[58] Field of Search ....................... 177/210 C; 73/718

[56] References Cited

U.S. PATENT DOCUMENTS

| | | | |
|---|---|---|---|
| 4,266,263 | 5/1981 | Haberl et al. | 177/210 C X |
| 4,512,431 | 4/1985 | Bloomfield | 177/210 C X |
| 4,589,054 | 5/1986 | Kuisma | 73/718 X |
| 4,594,639 | 6/1986 | Kuisma | 73/718 X |
| 4,738,324 | 4/1988 | Borchard | 177/210 C X |
| 4,825,967 | 5/1989 | Sakamoto et al. | 177/210 C |

Primary Examiner—George H. Miller, Jr.
Attorney, Agent, or Firm—James Creighton Wray

[57] ABSTRACT

This invention relates to force responsive transducers and more particularly concerns a micromachined, solid state micro-scale. The device consists of a central silicon platorm surrounded and supported by a thin silicon membrane. The silicon substrate is placed over an aluminum pad recessed into a well on a supporting glass substrate. The micro-scale responds to a static method of measuring force, similar to a spring scale. A gravitational acceleration vector acting on a mass placed onto the device produces a force known as weight. The weight mechanically displaces the silicon platform and membrane which is transduced to an electrical signal where a change in capacitance is measured. Geometry of the silicon platform, membrane and glass well depth may be used to affect the linearity, sensitivity and range of measurement of the micro-scale.

24 Claims, 3 Drawing Sheets

SILICON MEMBRANE MICRO-SCALE

SUMMARY OF THE INVENTION

The present invention relates to scales, the capabilities of which include but is not limited to the sensing of weights in the micrograms to milligram range and the method to obtain the capacitive property of the device to transduce the sensed weight vector to an electrical capacitive signal.

Semiconductor micro-scales are useful in biological, chemical and pharamaceutical laboratories where very minute weight measurements are required. The micro-scales produced by micromachined techniques allow various attractive features to be possible some of which include small size, low cost of production, ease of fabrication, ruggedness and high sensitivity.

The present invention uses a silicon membrane to select the spring constant (k) and sensitivity of the device.

An additional novel function of the silicon membrane resides in the bending in response to the weight vector displacing the dynamic portion of the capacitive plate relative to the static capacitive plate. Patent searches have disclosed the method of beams or arm to function as bending elements.

The novel structure to transduce a weight force vector to an electrical capacitive sensing output is described. The micromachined micro-scale consists of a silicon platform, membrane and die. The silicon substrate is placed over a conductive pad recessed into a well, on a supporting glass substrate. The silicon platform and membrane compose the dynamic portion of the capacitive plate while the aluminum pad in the glass substrate well serve as the static portion of the capacitive plate. The structure of the device is shown in FIG. 1. The micro-scale responds to a weight placed onto the silicon platform, with a displacement of the silicon platform and membrane changing the capacitive plate spacing. The new plate spacing is electrically sensed as an electrical capacitive change.

Thus it is the object of the present invention to sense weight as a transduced electrical capacitive change.

Another object of the invention is the use of a silicon membrane to determine the spring constant of the device.

Another object of the invention is the use of a silicon membrane as the bending element displacing the platform which serves as the dynamic portion of the capacitor.

Another object of the invention is to be able to sense minute weights over a sufficiently wide range through a transduced electrical capacitive change.

Another object of the invention is to have high sensitivity over a sufficiently wide range of weights.

Another object of the invention is the method of producing the micro-scale through batch processing technology and micromachining methods. This will minimize cost and size of the transducer and provide reproducibility of transducer performance from device to device.

The novelty of the invention resides in, but is not limited by the application and method of transduction of weight to capacitance. The transducers silicon platform is displaced by the gravitational acceleration vector acting on the weight which is placed onto the silicon platform. The platform is supported by the silicon membrane which bends whenever the transducer's silicon platform is subjected to a weight. The platform and membrane together with any other micromechanical or micromachined structure is fabricated by current standard processing and technology given the device is fabricated from silicon, the material of choice.

The ability to sense weight as a transduced electrical capacitance change utilizing a monolithic micromachined solid state transducer allows for the attractive features of economical production, ease of fabrication, reproducibility of performance parameters and the use of standard technologies.

The above signify the novel application and features characteristic to the invention and further manifests itself in the following description of each embodiment.

BRIEF DESCRIPTION OF THE DRAWINGS

Like numbers in bold print will be representative of like features shown in the figures.

DETAILED DESCRIPTION OF THE PREFERRED EMBODIMENT

Figure 1:
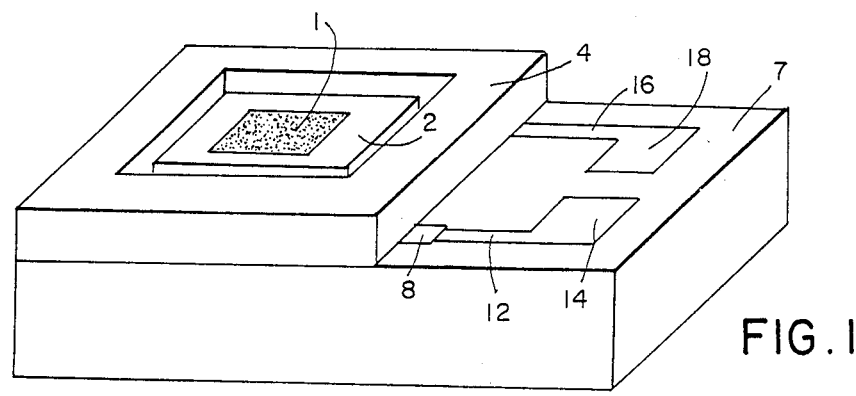
FIG. 1 is a schematic diagram of the device with a weight 1 on the silicon platform 2.

The present invention with its preferred embodiment is an application of a monolithic, micromachined solid state capacitance sensor used to sense the weight of a body of mass. The micro-scale with a weight 1 on the silicon platform 2 is shown in FIG. 1.

Figure 2:
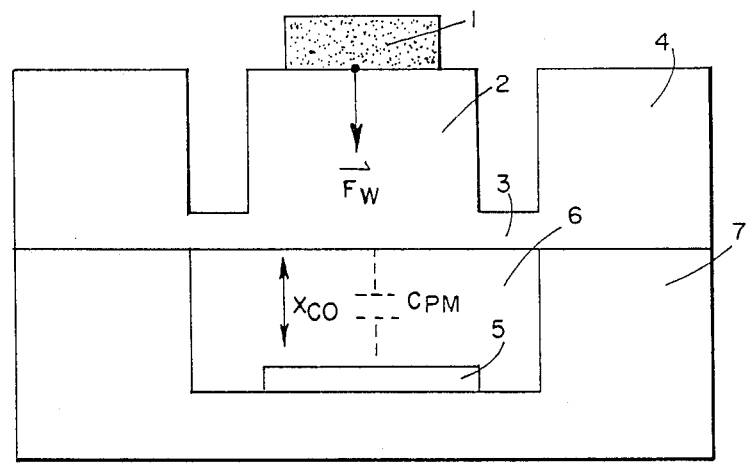
FIG. 2 is a schematic diagram of a weight 1 on the silicon platform 2 with a force vector $F_g$ altering the capacitive plate separation leading to a electrical capacitive change of the preferred embodiment. The silicon substrate consists of the platform 2, membrane 3 and die 4. The glass substrate 7 consists of the aluminum pad 5 recessed into the etched well 6.

A mass on the silicon platform 2 has acting on it an acceleration vector component (g) directed toward the center of the Earth. The resultant force component ($F_w$) is the weight 1 of a mass. The weight 1 decreases the capacitance plate separation from its original separation $X_{CO}$, by an amount $\Delta X_C$. Thus the resultant force weight 1 is sensed as an electrical capacitance change due to a decrease in the capacitive plate separation by $\Delta X_C$. This is shown in FIG. 2.

The micro-scale responds to a static method of measuring force similar to a spring scale, whereby the measurement of force is based on the fact that when a body under the action of several forces has zero acceleration, the vector sum of all the forces acting on that body must be zero. Thus with a known weight 1 placed onto the device platform 2, the gravitational force vector ($F_g$) displaces the platform 2 from $X_{CO}$ by an amount $\Delta X_C$, dependent upon an equal but oppositely directed spring force vector ($F_s$) shown in FIG. 3. Thus with only two oppositely directed vectors acting on the platform 2 with zero acceleration, it is concluded that $F_g$ and $F_s$ are vectors which are equal in magnitude, but oppositely directed.

Figure 4:
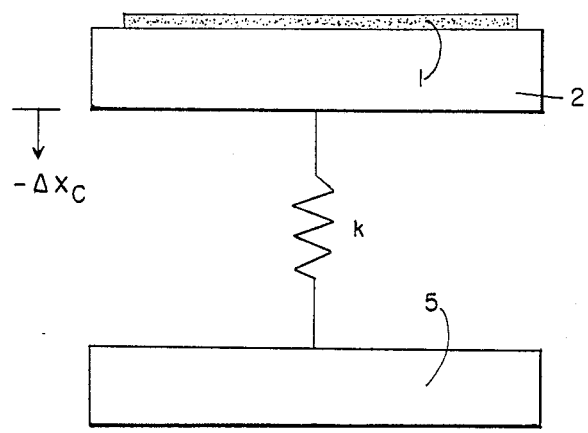
FIG. 4 is a mechanical analog model of the micro-scale which allows the sensitivity of the micro-scale to be easily determined and altered through micromachined and standard processing technology of the preferred embodiment. The spring constant (k) of the micro-scale is a function of silicon membrane 3 dimensions.

The displacement of the platform 2 due to the gravitational force vector acting on the weight 1 reflects a displacement of the dynamic capacitive plate. The degree to which a given weight 1 displaces the platform 2 is a function of the silicon membrane 3. The bending of the membrane 3 is modeled as a spring with a spring constant of k. This mechanical model is shown in FIG. 4. The ease of design and altering the spring constant or sensitivity of the micro-scale by altering the membrane 3 dimensions through standard micromachined fabrication technology is a preferred embodiment.

The device operation and the application for use as a micro-scale follows:

The device utilizes a static method of measuring force, in a manner similar to that of a spring scale. The method is based on the principle that when a body under the acceleration of several forces dirrected on to it has zero acceleration, the vector sum of all the forces acting on that body must be zero.

Figure 3:
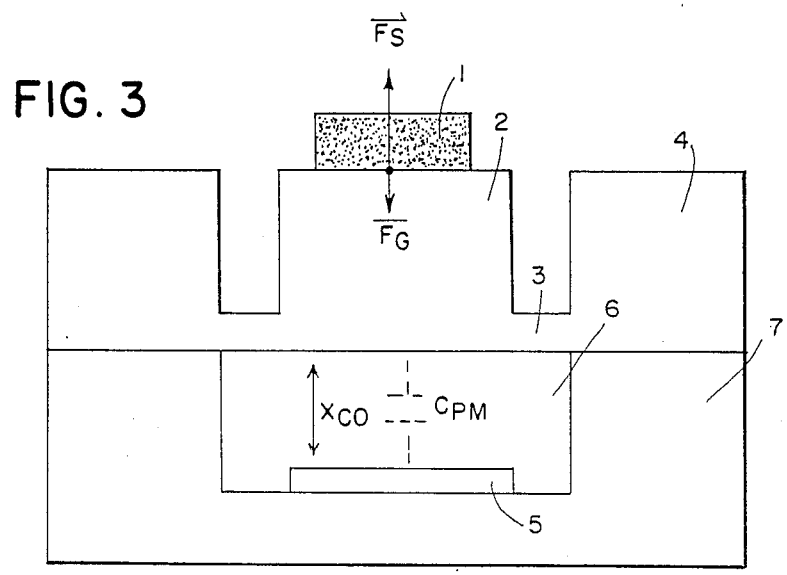
FIG. 3 is a schematic diagram of a weight 1 on the silicon platform 2 with a force vector $F_g$ and an equal but oppositely directed spring force vector $F_s$ from the silicon membrane 3. The magnitude of the $F_s$ is a function of the silicon membrane 3 dimensions of the preferred embodiment.

For the first stage, a known weight 1 is placed onto the silicon platform 2. The weight 1 (W) of a mass (M) is the gravitational acceleration $\vec{g}$ the mass experiences. The gravitational acceleration $\vec{g}$ exerted by the Earth is a vector quantity directed toward the center of the Earth. The magnitude of the weight force vector $\vec{F}_W$ is expressed in units of pounds [lbs.] or Newtons [N]. Applying Newton's second law $$\vec{F} = m\vec{a} \ [N] \tag{1}$$

the weight force vector $\vec{F}_W$ is $$\vec{F_W} = m\vec{g} \ [N] \tag{2}$$

where $$\vec{g} = 9.78 \ m/sec^2$$

directed toward the center of the Earth. With an arbitrary weight W 1 placed onto the device platform 2, the magnitude of the silicon platform 2 displacement is a function of the surrounding silicon membrane 3. The device response is similar to a spring scale in which a force is applied to a mass M and the corresponding change in the spring length is measured. The force exerted by the spring-like silicon membrane 3 $\vec{F}_s$ is equal in magnitude but opposite in direction to the force exerted by the weight vector $\vec{F}_W$ on the silicon platform 2. A cross sectional view of the device with the equal but oppositely directed force vectors $\vec{F}_s$ and $\vec{F}_W$, directed onto the silicon platform 2 is shown in FIG. 3. The spring force vector $\vec{F}_s$ is $$\vec{F_s} = -k\vec{\Delta x} \ [N] \tag{3}$$

where
  k = constant that describes the spring
  $\vec{\Delta x}$ = extension of the spring.

Equation 3 is an expression of Hooke's force law for springs. The direction of spring force is always opposite to the direction of the spring displacement from the origin where x=0 i.e., when the spring is stretched, ($\Delta x > 0$), $\vec{F}_s$ is negative and when the spring is compressed ($\Delta x < 0$), $\vec{F}_s$ is positive. Thus, the spring force $\vec{F}_s$ is a restoring force vector directed toward the origin of the spring where x=0.

The micro-scale device can be modeled as a mechanical network shown in FIG. 4. The ability of the silicon platform 2 to be deflected by the weight force vector $\vec{F}_W$ is determined by the stiffness of the silicon membrane 3 which is represented as a spring which supports the silicon platform 2. The silicon membrane 3 stiffness is defined with the spring constant k as $$k = \frac{\vec{F_W}}{\Delta X_C} \left[\frac{N}{m}\right] \tag{4}$$

where $\Delta \vec{X}_C$ = change in the capacitor plate separation from the initial plate separation $X_{CO}$ to the final plate separation $X_C$. Modeling the device as a fixed edge center loaded beam of length l, the deflection profile of an edge center loaded beam of length l with a deflection of $\Delta X_C$ is $$\Delta X_C(x) = \frac{Fx^2}{48EI} [4x - 3l] \ [m] \tag{5}$$

where
  F = applied force [N] E = modulus of elasticity for silicon [N/m$^2$] I = moment of inertia of the beam through the neutral axis [m$^4$].

Using Eq. 4, the spring constant for a beam of length l at the point of the applied force (x=l/2) is $$k\left(x = \frac{l}{2}\right) = \frac{F}{\Delta X_C(x)} \tag{6}$$

$$= \frac{F}{\frac{Fx^2}{48EI}(4x - 3l)} \tag{7}$$

$$= \frac{48EI}{\frac{l^2}{4}(2l - 3l)} \tag{8}$$

$$k\left(x = \frac{l}{2}\right) = \frac{192EI}{l^3} . \tag{9}$$

Solving for the moment of inertia I of an elemental length of beam which represents the silicon membrane 3 in Eq. 5 is $$I = \int_{-h/2}^{h/2} y^2 dy dz \tag{10}$$

$$= \frac{1}{3} h^3 \Big|_{-h/2}^{h/2} dz \tag{11}$$

$$= \left[\frac{1}{3}\left(\frac{h}{2}\right)^3 - \frac{1}{3}\left(-\frac{h}{2}\right)^3\right]dz \quad (12)$$

$$= \frac{2h^3}{24} dz \quad (13)$$

$$= \frac{h^3}{12} dz [m^4] \quad (14)$$

where h=silicon membrane 3 thickness [m].

Substituting Eq. 14 into Eq. 9 for a length of the membrane 3 of length l along the z axis, the spring constant k for a fixed edge silicon membrane 3 simplifies to $$dk = \frac{16E}{l(z)^3} h^3 dz \quad (15)$$

$$k = 16Eh^3 \int_0^z \frac{1}{l(z)^3} dz \quad (16)$$

With membrane 3 dimensions of 2.5 mm along the z axis (length of one side) and 0.5 mm along the x axis (width), the specific solution using Eq. 16 for the device is $$k = 1.026E\text{-}5 \, Nm \int_0^{.0025m} \frac{1}{(.0005m)^3} dz \quad (17)$$

$$k = 205.2 \frac{N}{m}. \quad (18)$$

the 1 by 1 square silicon platform 2 is supported on all four sides by the silicon membrane 3, which is modeled as a beam. Thus Eq. 16 represents the silicon membrane 3 on one side of the silicon platform 2 which is 25% of the total membrane 3 area which contributes to the spring constant k. Therefore the total spring constant $k_T$ of the device is $$k_T = 4k = 820.8 \frac{N}{m}. \quad (19)$$

For a static method of measuring weight 1, the magnitude of the displacement of the silicon platform 2 depends on the magnitude of the mass M placed onto the silicon platform 2 and the spring constant k of the silicon membrane 3. From Eq. 2 and Eq. 4 the magnitude of the displacement of the silicon platform 2 is $$F = -k(-\Delta \vec{X}_C) = M\vec{g} [N] \quad (20)$$

where
  $\epsilon_O$=permittivity of air
  A=area of the silicon platform 2 and the silicon membrane 3.

The original total capacitance $C_O$ is composed of three components which are $$C_O = C_{PM} + C_M + C_P \quad (24)$$

where
  $C_{PM}$=silicon platform 2 capacitance
  $C_M$=silicon membrane 3 capacitance
  $C_P$=total parasitic capacitance.

The silicon platform 2 capacitance $C_{PM}$ in Eq. 24 is $$C_{PM} = \frac{\epsilon_o A_{PM}}{X_C} \quad (25)$$

where $A_{PM}$=area of the silicon platform 2.

Assuming that the silicon platform 2 is uniformly displaced along the x-axis, the silicon platform 2 capacitance $C_{PM}$ as a function of the change in the capacitor plate separation $\Delta X_C$ is $$C_{PM} = C_O\left(1 - \frac{\Delta X_C}{X_{CO}}\right) + C_P. \quad (26)$$

Furthermore, Hooke's law requires for a deflection of the silicon membrane 3, the silicon platform 2 displacement $\Delta X_C$ must be proportional to the gravitational vector $\vec{g}$ acting on the mass M on the silicon platform 2 as $$M\vec{g} = -k\Delta \vec{X}_C \quad (27)$$

where k=Hooke's law spring constant dependent on the silicon membrane 3 thickness and width.

Solving for the silicon platform 2 displacement $\Delta X_C$ as a function of the spring constant k, $$\Delta X_C = -\frac{M\vec{g}}{k}. \quad (28)$$

Substituting Eq. 28 into Eq. 26, the silicon platform 2 capacitance $C_{PM}$ as a function of the spring constant k is $$C_{PM} = -\frac{M\vec{g}}{kX_{CO}} + C_O + C_P \quad (29)$$

$$C_{PM} = C_2 - \frac{M\vec{g}}{kX_{CO}} \quad (30)$$

where $C_2 = C_O + C_P.$

Thus, the change in the silicon platform 2 capacitance $C_{PM}$ is linearly proportional to the magnitude of the weight force vector $\vec{F}_W$ which is the product of the mass on the silicon platform 2 M and the gravitational vector $\vec{g}$ as seen in Eq. 30. The capacitance due to the silicon membrane 3 $C_M$ in Eq. 24 is $$C_M = \frac{\epsilon_o A_M}{X_C} \quad (31)$$

where $A_m$=area of the silicon membrane 3.

There are two components which contribute to the total parasitic capacitance $C_P$ in Eq. 24. The first component can be attributed to an incomplete bond between the silicon substrate and glass substrate which results in a parasitic capacitance $C_{P1}$ across the finite distance $d_{P1}$ between the two substrates. The parasitic capacitance $C_{P1}$ is $$C_{P1} = \frac{\epsilon_o A_{P1}}{d_{p1}} \quad (32)$$

where $A_{p1}$ = area of aluminum strip along the periphery of the glass well 6

$d_{p1}$ = air gap between the silicon substrate and the glass substrate.

The presence of the air gap $d_{p1}$ contributes to the parasitic capacitance $C_{P1}$ as shown in Eq. 32. Anodic glass to silicon bonding is selected to bond the two substrates, rather than adhesive bonding techniques since the potential for an incomplete bond which produce air gaps is greater for the adhesive bonding technique. Thus $C_{P1}$ can be essentially eliminated by utilizing anotic glass to silicon bonding.

A second area of potential parasitic capacitance $C_{P2}$ occurs in the extended etched channel of the glass substrate. The extended etched channel vents the air from within the capacitor cavity and allows the extension of the electrical contact from the aluminum pad 5 without shorting to the silicon substrate. The extended etched channel has a parasitic capacitance $C_{P2}$ of $$C_{P2} = \frac{\epsilon_o A_{p2}}{d_{p2}} \tag{33}$$

where $A_{p2}$ = area of aluminum strip in the channel below the silicon substrate.

$d_{p2}$ = air gap between the aluminum strip and the silicon substrate.

Unlike $C_{p1}$, $C_{p2}$ is inherent to the device design and cannot be eliminated.

An experimental method to measure the parasitic capacitance of the device involves the removal of the silicon platform 2 and the surrounding silicon membrane 3. The resulting capacitance change from the initial capacitance of the intact device is the parasitic capacitance $C_p$ which is $$C_p = (C_{PM} + C_M) - (C_{w/o\ PM} + C_{w/o\ M}) \tag{34}$$

where $C_{w/o\ PM}$ = device without the silicon platform 2

$C_{w/o\ M}$ = device without the silicon membrane 3.

Therefore the contribution of the three capacitive components, which include the silicon platform 2 capacitance $C_{PM}$, the silicon membrane 3 capacitance $C_M$ and the total parasitic capacitance $C_p$ to the initial capacitance $C_O$ with zero acceleration vector on the device can be quantified using Eq. 25 as $$C_O = \epsilon_o \left[ \left( \frac{A_{PM} + A_M}{Y_{CO}} \right) + \frac{A_{p1}}{d_{p1}} + \frac{A_{p2}}{d_{p2}} \right] [F]. \tag{35}$$

For the static method of measuring the force, the weight force vector $\vec{F}_W$ changes the initial capacitor plate separation $X_{CO}$ to the final capacitor plate separation $X_C$ by a distance $\Delta X_C(\vec{W})$ as was shown in Eq. 23. The resulting change in the capacitance $\Delta C$ due to the change in the capacitor plate separtion $\Delta X_C(\vec{W})$ is $$\Delta C = \frac{\epsilon_o A}{\Delta X_C} \tag{36}$$

With the weight force vector $\vec{F}_W$ directed onto the silicon platform 2, the resulting change in the capacitance $\Delta C$ from the initial capacitance $C_O$ to the final capacitance $C$ has an inverse square relationship to the resulting change in the capacitor plate separation $\Delta X_C$.

The change in the capacitance $\Delta C$ from Eq. 36 with respect to the change in the capacitive plate separation $\Delta X_C$ is $$\frac{\delta C}{\delta X_C} = \frac{\delta \epsilon_O}{\delta X_C} \left( \frac{A}{X_C} \right) + \frac{\delta A}{\delta X_C} \left( \frac{\epsilon_O}{X_C} \right) + \frac{\delta X_C^{-1}}{\delta X_C} (\epsilon_O A). \tag{37}$$

The permittivity of air and the silicon platform 2 area remains constant therefore the first and the second term in Eq. 37 goes to zero. Equation 37 then simplifies to $$\frac{\delta C}{\delta X_C} = -\frac{\delta X_C^{-1}}{\delta X_C} (\epsilon_O A) \tag{38}$$

$$= -\frac{\epsilon_O A}{X_C^2} \tag{39}$$

$$\delta C = -\frac{\epsilon_O A}{X_C^2} \delta X_C \tag{40}$$

$$\Delta C = -\frac{\epsilon_O A}{X_C^2} \Delta X_C \tag{41}$$

Thus the change in the capacitor plate separation $\Delta X_C$ has a linear effect to the change in the capacitance $\Delta C$. The final capacitor plate separation $X_C$ has an inverse square relationship on the change in the capacitance $\Delta C$ shown in Eq. 41. The change from the initial capacitance $C_O$ to the final capacitance $C$ by $\Delta C$ as a function of the weight force vector $\vec{F}_W$ directed onto the silicon platform 2 is the final capacitance $C(\vec{W})$. The final capacitance $C(\vec{W})$ as function of the weight 1 W which is the gravitational vector $\vec{g}$ acting on the mass M which is placed onto the silicon platform 2 is $$C(\vec{W}) = C_O + \Delta C \tag{42}$$

Substituting Eq. 23 and Eq. 38 into Eq. 42, the final capacitance $C(\vec{W})$ as a function of the change in the capacitor plate separation $\Delta X_C$ is $$C(\vec{W}) = \frac{\epsilon_O A}{X_{CO}} + \frac{\epsilon_O A}{\Delta X_C} \tag{43}$$

which can be rewritten as $$C(\vec{W}) = \epsilon_O A \left[ \left( \frac{1}{X_{CO} + \Delta X_C} \right) \right] [F]. \tag{44}$$

Substituting Eq. 21 into Eq. 44, the final capacitance change $C(\vec{W})$ due to weight force vector $\vec{F}_W$ which is the gravitational vector $\vec{g}$ acting on the mass M is $$\Delta X_C = \frac{M\vec{g}}{k} \tag{21}$$

$$C(\vec{W}) = \epsilon_O A \left[ \left( \frac{1}{X_{CO} + \frac{M\vec{g}}{k}} \right) \right] [F]. \tag{45}$$

The resultant capacitive change $\Delta C(\vec{W})$ from the initial capacitance $C_O$ to the final capacitance $C(\vec{W})$ due to a force weight vector vector $\vec{F}_W$ directed onto the silicon platform 2 from Eq. 38 is $$\Delta C(\vec{W}) = C(\vec{W}) - C_O \quad (46)$$

Substituting Eq. 24 and Eq. 43 into Eq. 46 the final change in capacitance $\Delta C(\vec{W})$ as a function of the weight force vector $\vec{F}_W$ from the initial capacitance $C_O$ to the final capacitance $C(\vec{W})$ is $$\Delta C(\vec{w}) = \epsilon_O A \left[ \left( \frac{1}{X_{CO} + \frac{M\vec{w}}{k}} \right) \right] - \frac{\epsilon_O A}{X_{CO}} \quad (47)$$

$$\Delta C(\vec{w}) = \epsilon_O A \left[ \frac{1}{X_{CO} + \frac{M\vec{g}}{k}} - \frac{1}{X_{CO}} \right] [F]. \quad (48)$$

Figure 5:
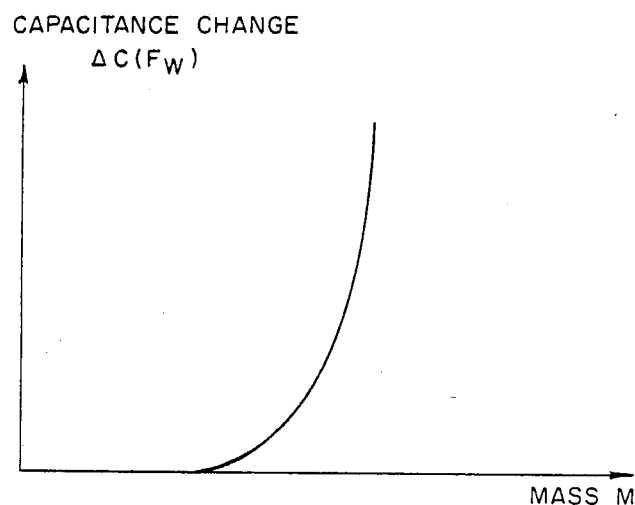
FIG. 5 is a theoretical mass versus capacitance change characteristics curve for the silicon membrane micro-scale. The inverse square relationship between the change in the capacitance $\Delta C$ and the mass M placed onto the silicon platform is shown $[\Delta C(F_W) \alpha 1/M^2]$.

The preceding quantitative discussion has been on the silicon membrane 3 micro-scale. A mass M placed onto the silicon platform 2 and the Earth's gravitational acceleration vector $\vec{g}$ acting on the mass M produces a weight force vector $\vec{F}_W$ which is directed onto the silicon platform 2. The weight force vector $\vec{F}_W$ displaces the silicon platform 2 by a distance $\Delta X_C(\vec{W})$. The displacement $\Delta X_C(\vec{W})$ is transduced in a linear and proportional manner to a change in the capacitance $C(\vec{W})$ from the initial capacitance $C_O$ to the final capacitance $C(\vec{W})$ of the silicon micro-scale. The final capacitor plate separation $X_C$ has an inverse square relationship on the change in the capacitance $\Delta C(F_W)$ as was shown in Eq. 41 and plotted in FIG. 5.

Diverse applications of the said capacitive device exists. The micro-scale a specific example, can be designed for both sensitivity and range of weights 1. The specific design considerations and requirements are easily fulfilled through said micro-scale by dimensional design and process specific parameters. With a rigid design, the said micro-scale can be used in laboratories requiring high sensitivity and minute weight 1 measurements.

Although the desciption of the preferred embodiment given above essentially characterizes the novel application, it is to be understood that the invention is not limited to this precise embodiment and the additional modification which do not depart from the spirit and scope of the said invention as the use of different dimensions or geometries for the silicon platform 2 of membrane 3 can be made.

Figure 6:
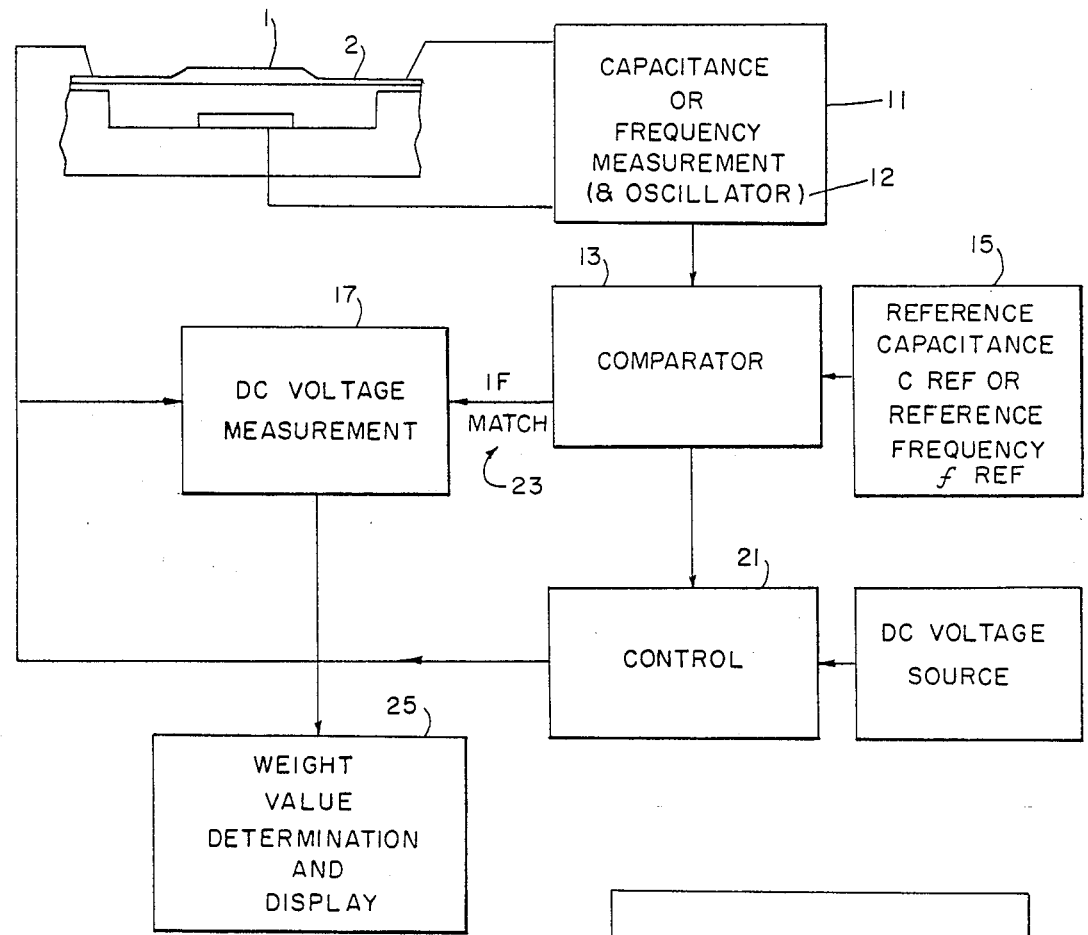
FIG. 6 is a schematic drawing of weight measurement by an alternate method.

An alternative method of measuring the mass employs the application of a d.c. voltage to the scale capacitor as shown in FIG. 6. The d.c. voltage attracts the movable capacitor plate 2 with an additional (electrical) force. By choosing a reference capacitance value $C_{ref}$, or a related frequency reference value $f_{ref}$ 11, which is related to $C_{ref}$ via electronic oscillator circuitry 12, such as a relaxation oscillator and using the applied d.c. voltage 19 to achieve $C_{ref}$ or $f_{ref}$ the value of the unknown weight 1 can be determined by applying a d.c. voltage 14, the scale platform 2 can be displaced. If the weight to be measured is already on the scale, less additional force is necessary to achieve $C_{ref}$ or $f_{ref}$, and thus a smaller d.c. voltage 19 is required to be applied to the capacitor to achieve $C_{ref}$ or $f_{ref}$. The one-to-one relationship between the applied d.c. voltage $V_{dc}$ 19 and unknown scale weight 1 to be measured allows the unknown weight value to be determined by measuring the value of $V_{dc}$ necessary to achieve $C_{ref}$ or $f_{ref}$. If $f_{ref}$ is used as a null reference the scale reference position can be determined to high precision. When the reference value $C_{ref}$ or $f_{ref}$ is achieved, an accurate measurement of the d.c. voltage value necessary to provide $f_{ref}$ or $C_{ref}$ provides a precise measurement of the unknown weight on the scale platform. Accurate d.c. voltage measurement is easily achieved using off-the-shelf readily available instruments 17. The same is true for precise frequency measurement 11 and capacitive measurement 11.

An advantage of using a frequency reference $f_{ref}$ is that its value can be measured to very high precision using simple counting circuitry or off-the-shelf instruments 11. Comparison 13 of the actual frequency f(c) of $f_{ref}(C_{ref})$ can be electronically achieved and the difference between the actual frequency f and the reference frequency $f_{ref}$ converted to a d.c. connection voltage 21 which can be fed back to the scale pedestal 19, 2 to automatically achieve the value of $V_{dc}$ which adjusts C to $C_{ref}$ or f to $f_{ref}$. The match information can then be fed 23 to the d.c. voltage measurement instrument to deliver the voltage value to a readout device 25.

The value of $V_{dc}$ can then be automatically measured 17 and converted to a value for the weight being measured 25. This weight value may then be automatically displayed 25 on a digital readout device.

Increased d.c. voltage pulls the platform down to the predetermined reference spacing. The d.c. voltage is in inverse relationship to the weight measured.

An example of parameters for the micromechanical device are platform 2 dimensions of 2.5 mm×2.5 mm, a square area, and platform 2 thickness of 0.4 mm, a supporting membrane 3 of thickness 1.1 mm and width 0.5 mm., a capacitor plate separation (cavity depth) of approximately 3.0 microns, and cavity 6 area of approximately 3.5 mm×3.5 mm with a conducting aluminum capacitor plate 7 of 0.1 micron thickness and an area of approximately 2.5 mm×2.5 mm resulting in a capacitance of approximately 8 pF. Variation of the capacitance with a voltage ranging from $-30$ V to $+30$ V across the two capacitor plates resulted in a variation of approximately 0.03 pF. Typical spring constants, depending on membrane thickness, vary between 341–1658 N/W (newtons/meter) for membrane thicknesses between 1.1 micron and 1.6 micron. A typical frequency variation for a 1.1 micron membrane thickness as a function of mass being weighed is a fraction of a MHz ($\leq 1$ MHz) to 8 MHz for a range of 10 $\mu$gm to about 700 $\mu$gm.

In certain cases there may be an advantage in damping the motion of the platform 2 which responds to a force and which moves to cause a capacitance change. Damping, including critical damping, underdamping and overdamping are easily incorporated in the device by creating a port in the supporting substrate between the region between the two capacitor plates and between the surroundings. The flow of a fluid such as air through the port is affected by the port length, shape and cross section. The resistance of the fluid flow caused by the port can be used to damp the motion of the moving platform. The rate of damping the platform motion can be affected by suitable choice of port length and size.

Electrical interconnects to the conduction plate can be passed through the same port, a similar port or passed through the region between the substrate means and the support means.

An example of a device structure and the related fabrication follows. For example, the Silicon Membrane Micro-Scale consists of an anistropically etched central silicon platform 2 surrounded and supported by a spring-like thin silicon membrane 3 shown in FIG. 1. The silicon membrane 3 is supported by a silicon die 4 which is anodically bonded to a glass substrate 7 using standard glass to silicon bonding technology. Device fabrication consists of three major processing steps; silicon substrate processing, glass substrate procesing and glass to silicon bonding.

The central platform 2, the membrane 3 and the die 4 structures can be fabricated on a single, p-type, (100) orientation silicon wafer doped with boron at $>10^{18}$ cm$^{-3}$. The silicon platform 2, the supporting membrane 3, and the die 4 patterns were defined by growing a 7200 Å thick silicon dioxide blocking mask at 1100° C. for 60 minutes. The oxide mask blocks the subsequent diffusion of boron into the nonpolished (black) surface of the silicon wafer and is eventually anisotropically etched. The polished (front) and exposed back surface of the wafer are simultaneously doped with boron nitride solid source wafers at 1100° C for 60 minutes. After the boron predeposition, the borosilicate glass and the blocking oxide mask are stripped off using 10:1 deionized water: hydrofloric acid (HF). The wafers are then immediately submerged in an anisotropic etching solution of ethylene diamine pyrocatachol (EDP) at 115° C. [6]. The undoped membrane 3 pattern on the back surface of the wafer is anisotropically etched to the heavily doped p$^+$($>7\times10^{19}$ cm) etch stop layer which is diffused into the front surface creating, a 1.6 $\mu$m thick supporting membrane 3 structure. The complete silicon substrate structure is a 2.5 mm×2.5 mm square central platform, supported by a 0.5 mm wide membrane, surrounded by a 2.5 mm wide die support structure, in this example.

The glass substrate material uses 7740 Corning glass (Pyrex). The Pyrex glass has a reported thermal expansion coefficient which nearly matches the thermal expansion coefficient of the silicon substrate. A comparable thermal expansion coefficient is important for minimizing the stresses between the silicon substrate and the glass substrate during the high temperature glass to silicon bonding process. A 3 $\mu$m deep well 6 is etched into the glass substrate using buffered HF which consists of 500 gm:735 ml:110 ml, NH$_4$F:DI:HF. Centered within the etched well 6, an evaporated aluminum pad 5 functions as the static electrode portion of the capacitor. An aluminum strip is evaporated along the periphery of the etched well 6 providing an ohmic contact to the silicon die 4.

Figure 7:
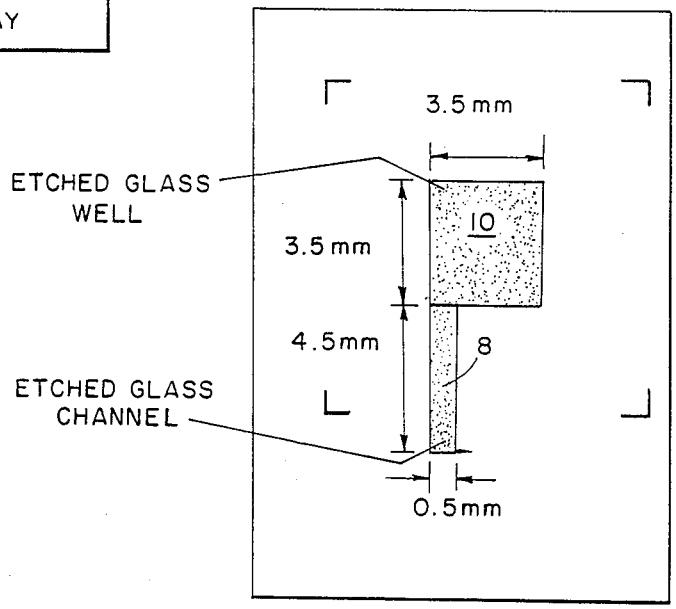
FIG. 7 is a drawing of the glass substrate and etched well.

As shown in FIG. 7 an etched channel 8 extending from the glass well 10 vents the air within the capacitor cavity 6 and allows for an electrical contact to the aluminum pad 5 without shorting the aluminum pad to the silicon substrate. Electrical contact to the aluminum pad is shown in FIG. 1. An aluminum conductor strip 12 extends from widened contact 14 and disappears into channel 8 to join pad 5. Aluminum strip 16 extends from contact 18 to beneath the silicon die 4 where direct electrical contact occurs.

Figure 8:
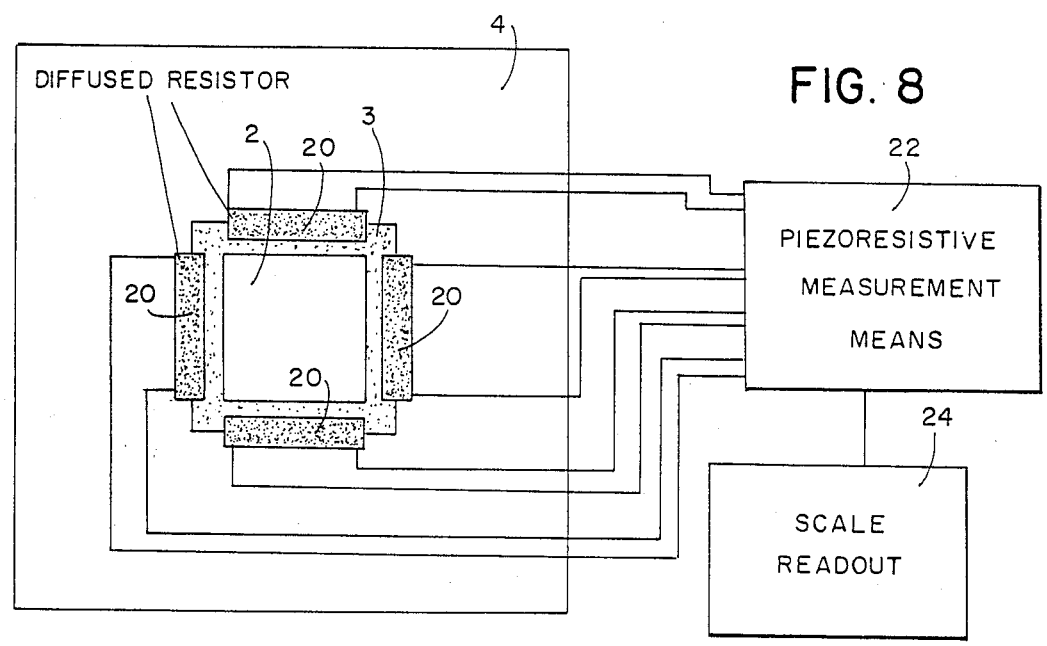
FIG. 8 shows a piezoresistive-sensing means.

The membrane is displaced as a function of weight. The displacement may be measured using reflected light and polarizing grids. Preferably the displacement is measured by measuring a change in capacitance between a conductor in or on the membrane and a fixed conductor in the well. Alternatively voltage is applied between the two conductors to return the membrane to a null position, a known, measured capacitive postion. The weight on the membrane may be determined by measuring the voltage required to return the membrane to the null position. Alternatively or conjointly for redundancy, as shown in FIG. 8, the membrane 3 displacement can be measured using one or more piezoresistive diffused resistors 20 on the membrane which change resistance with an application of a strain to the device. The strain in the membrane 3 due to the weight 1 can be characterized by the measured piezoreistivity, summed or averaged in measurement means 22 and converted to a readout on scale indicator 24.

While the invention has been described with reference to specific embodiments, modifications and variations of the invention may be made without departing from the scope of the invention which is defined in the following claims.

We claim:

1. The method of measurement of weight comprising displacing a capacitive plate by a gravitational force vector and electrically sensing capacitive change and determining weight as a function of capacitive change, further comprising supporting the capacitive plate on a silicon membrane and determining the spring constant of the silicon membrane.

2. The method of claim 1 further comprising transducing the displacing of the capacitive plate to an electrical signal and wherein the electrically sensing the capacitive change comprises sensing the signal.

3. The method of claim 1 further comprising subjecting the silicon membrane to the force vector of the weight and bending the silicon membrane and wherein the displacing the capacitive plate comprises changing capacitor plate separation.

4. The method of claim 1 wherein the measuring comprises sensing weight over a wide range through a transduced electrical capacitive change.

5. The method of measurement of weight comprising displacing a capacitive plate by a gravitational force vector and electrically sensing capacitive change and determining weight as a function of capacitive change, wherein the method further comprises establishing a known separation of capacitive plates by a known weight on a displaceable plate, establishing a reference electrical value of capacitance indicative of the known separation, placing an unknown weight on the displaceable plate, applying voltage to the plate and thereby moving the plate, changing applied voltage, sensing an electrical value of capacitance, comparing the sensed and established values, measuring applied voltage when the values are similar and converting the measured voltage to weight.

6. The method of claim 5 wherein the establishing, sensing and comparing comprise establishing, sensing and comparing frequency.

7. The method of measurement of weight comprising displacing a capacitive plate by a gravitational force vector and electrically sensing capacitive change and determining weight as a function of capacitive change, wherein the determining comprises applying voltage to the plate and moving the plate to a predetermined capacitive position by the applied voltage, measuring the applied voltage and indicating weight according to the applied voltage.

8. The method of claim 7 wherein the applying voltage comprises applying d.c. voltage.

9. The method of claim 7 wherein the indicating weight comprises indicating weight values which are inversely related to measured values of applied voltage.

10. Micro-scale apparatus for measurement of weight, comprising first and second capacitive plates, a silicon membrane for supporting the first plate and fixed means for supporting the second plate, weight-receiving means on the first plate, circuit means connected to the first and second plates and capacitance measuring means connected to the circuit means, whereby displacement of the first capacitive plate by gravitational force vector of a weight on the weight-receiving means is transduced to an electrically sensed capacitive change, and wherein the capacitance measuring means determines spring constant of the silicon membrane.

11. Micro-scale apparatus for measurement of weight, comprising first and second capacitive plates, a membrane means for supporting the first plate and fixed means for supporting the second plate, weight-receiving means on the first plate, circuit means connected to the first and second plates and capacitance measuring means connected to the circuit means, whereby displacement of the first capacitive plate by gravitational force vector of a weight on the weight-receiving means is transduced to an electrically sensed capacitive change, wherein the first capacitive plate and the membrane means comprise an integrally formed plate, a reduced thickness area surounding the plate and forming the membrane means, and a relatively thick portion outside of the membrane means for supporting the membrane means.

12. Micro-scale apparatus for measurement of weight, comprising first and second capacitive plates, a membrane means for supporting the first plate and fixed means for supporting the second plate, weight-receiving means on the first plate, circuit means connected to the first and second plates and capacitance measuring means connected to the circuit means, whereby displacement of the first capacitive plate by gravitational force vector of a weight on the weight-receiving means is transduced to an electrically sensed capacitive change, wherein the second capacitive plate comprises a thin film opposite the first capacitive plate and wherein the support means for holding the second capacitive plate in a fixed position comprises a glass block having a well in which the thin film plate is positioned and having a raised outer periphery for supporting the outer support of the integral first capacitive plate and membrane means.

13. Micro-scale apparatus for measurement of weight, comprising first and second capacitive plates, a membrane means for supporting the first plate and fixed means for supporting the second plate, weight-receiving means on the first plate, circuit means connected to the first and second plates and capacitance measuring means connected to the circuit means, whereby displacement of the first capacitive plate by gravitational force vector of a weight on the weight-receiving means is transduced to an electrically sensed capacitive change, comprising voltage applying means connected to the plates for moving the first plate with applied voltage, voltage controlling means connected to the voltage applying means for controlling level of applied voltage, reference means for providing a reference capacitive value, comparator means connected to the reference means and to the measuring means for comparing the reference capacitance and the measured capacitance and connected to the controlling means for changing the voltage with the controlling means until the reference and measured capacitance are similar, voltage sensing means connected to the voltage applying means for sensing applied voltage and weight indicating means connected to the voltage sensing means for indicating weight as a function of sensed voltage.

14. A micro-scale apparatus for measuring small weights comprising a block having a central plate receiver formed in an upper surface thereof and having upper outer surfaces surrounding the plate receiver, a fixed capacitive plate fixed centrally in the receiver, a dynamic plate member comprising a central proof mass body, a thin membrane means surrounding the body and a relatively thick supporting means surrounding the thin membrane means, whereby the supporting means supports the dynamic plate member on the block and supports the membrane means and the membrane means supports the body spaced from the fixed plate.

15. The micro-scale apparatus of claim 14 wherein the body, membrane means and supporting means are formed of a unitary silicon member.

16. The micro-scale apparatus of claim 14 wherein the block is a glass block and the plate receiver is an outward opening well in the block and wherein the fixed plate is fixed on a bottom of the well.

17. The micro-scale apparatus of claim 14 wherein the dynamic plate member is a silicon member.

18. The micro-scale apparatus of claim 17 wherein the port means comprises means for flowing gas.

19. The micro-scale apparatus of claim 17 wherein the port means comprises a damping means with a length and cross section for providing a specific amount of damping of motion of the dynamic plate member displacement.

20. The micro-scale apparatus of claim 19 wherein the damping means comprises means for providing critical damping.

21. The micro-scale apparatus of claim 14 wherein the block contains a port means connected to the receiver for flowing fluid into and out of the receiver.

22. The apparatus of claim 14 wherein the membrane means comprises a controlled geometry and dimension membrane means changeable for affecting the micro-scale sensitivity and measurement range.

23. The apparatus of claim 14 wherein the supporting means for holding the dynamic plate member in a fixed position is silicon.

24. The apparatus of claim 14 wherein the block comprises a glass block and the receiver comprises a well in the glass block and wherein a depth of the well in the glass block is controlled for determining the micro-scale sensitivity and measurement range.

* * * * *